US009912096B2

(12) United States Patent
Nomura et al.

(10) Patent No.: US 9,912,096 B2
(45) Date of Patent: Mar. 6, 2018

(54) TERMINATED ELECTRIC WIRE AND METHOD FOR MANUFACTURING TERMINATED ELECTRIC WIRE

(71) Applicants: AUTONETWORKS TECHNOLOGIES, LTD., Yokkaichi-Shi, Mie (JP); SUMITOMO WIRING SYSTEMS, LTD., Yokkaichi-Shi, Mie (JP); SUMITOMO ELECTRIC INDUSTRIES, LTD., Osaka-Shi, Osaka (JP); KYUSHU UNIVERSITY, Fukuoka-Shi, Fukuoka (JP)

(72) Inventors: Hideki Nomura, Yokkaichi (JP); Hiroki Hirai, Yokkaichi (JP); Junichi Ono, Yokkaichi (JP); Takuji Ootsuka, Yokkaichi (JP); Takehiro Hosokawa, Yokkaichi (JP); Tatsuya Hase, Yokkaichi (JP); Kazuhiro Goto, Osaka (JP); Kazuo Nakashima, Yokkaichi (JP); Makoto Mizoguchi, Fukuoka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); KYUSHU UNIVERSITY, Fukuoka (JP)

( * ) Notice: Subject to any disclaimer, the term of this patent is extended or adjusted under 35 U.S.C. 154(b) by 0 days.

(21) Appl. No.: 14/903,440

(22) PCT Filed: Jul. 8, 2014

(86) PCT No.: PCT/JP2014/068164
§ 371 (c)(1),
(2) Date: Jan. 7, 2016

(87) PCT Pub. No.: WO2015/005327
PCT Pub. Date: Jan. 15, 2015

(65) Prior Publication Data

US 2016/0156127 A1 Jun. 2, 2016

(30) Foreign Application Priority Data

Jul. 10, 2013 (JP) ................................ 2013-144206

(51) Int. Cl.
*H01R 4/00* (2006.01)
*H02G 3/06* (2006.01)
(Continued)

(52) U.S. Cl.
CPC .......... *H01R 13/533* (2013.01); *H01B 1/023* (2013.01); *H01R 4/18* (2013.01); *H01R 13/03* (2013.01);
(Continued)

(58) Field of Classification Search
CPC ............. B32B 15/043; B32B 2250/02; B32B 2255/06; B32B 2255/24; B32B 2255/26;
(Continued)

(56) References Cited

U.S. PATENT DOCUMENTS 4,522,785 A * 6/1985 D'Errico ................ C23F 11/04 252/390
4,812,363 A * 3/1989 Bell ...................... B05D 7/148 156/307.3

(Continued)

FOREIGN PATENT DOCUMENTS

CN 102742083 A 10/2012
JP H04-314894 A 11/1992

(Continued)

OTHER PUBLICATIONS

Inhibition of copper corrosion by 1-2-3-benzotriazole A review_ May 2010.*

(Continued)

*Primary Examiner* — Timothy Thompson
*Assistant Examiner* — Guillermo Egoavil
(74) *Attorney, Agent, or Firm* — Oliff PLC

(57) ABSTRACT

A terminated electric wire includes an electric wire that includes a core wire including a metal having an ionization tendency larger than that of copper and being exposed from an end portion of the electric wire, and a terminal that includes copper or a copper alloy and is connected to the exposed core wire. A surface treating layer includes a surface treating agent that is in liquid form or in paste form and whose molecular structure contains an affinity group having an affinity for the terminal and a hydrophobic group having hydrophobicity, and is formed on a surface of the terminal. As a result, the electrolytic corrosion resistance of the terminated electric wire is improved.

9 Claims, 5 Drawing Sheets

(51) Int. Cl.

| | |
|---|---|
| ***H02G 15/08*** | (2006.01) |
| ***H01R 13/533*** | (2006.01) |
| ***H01R 13/03*** | (2006.01) |
| ***H01B 1/02*** | (2006.01) |
| ***H01R 43/048*** | (2006.01) |
| *H01R 4/62* | (2006.01) |
| *H01R 4/18* | (2006.01) |

(52) U.S. Cl.
CPC .......... *H01R 43/048* (2013.01); *H01R 4/185* (2013.01); *H01R 4/188* (2013.01); *H01R 4/62* (2013.01)

(58) Field of Classification Search
CPC .. B32B 2307/73; C02F 1/68; C02F 2103/023; C02F 2303/08; C08G 18/6229; C08G 18/8029; C08G 2190/00; C22C 9/00; C09J 133/06; C09J 133/14; C23C 22/52; C23F 11/10; C23F 11/149; H01B 1/02; H01B 1/023; H01R 4/18; H01R 4/62; H01R 4/70; H01R 4/185; H01R 4/187; H01R 4/188; H01R 13/03; H01R 13/533; H01R 43/00; H01R 43/16; H01R 43/048; Y10T 428/28; Y10T 428/2809; Y10T 428/2826; Y10T 428/2852; Y10T 428/2878; Y10T 428/2891
USPC .............. 174/84 R; 422/7; 428/457; 522/75; 524/91
See application file for complete search history.

(56) References Cited

U.S. PATENT DOCUMENTS

| | | | | |
|---|---|---|---|---|
| 8,641,461 | B2 | 2/2014 | Mitose et al. | |
| 2004/0178149 | A1* | 9/2004 | Hernandez | B01J 20/20 210/688 |
| 2011/0245364 | A1 | 10/2011 | Song et al. | |
| 2012/0308432 | A1* | 12/2012 | Matulewicz | C23F 11/10 422/7 |
| 2013/0040509 | A1 | 2/2013 | Mitose et al. | |

FOREIGN PATENT DOCUMENTS

| | | | | | |
|---|---|---|---|---|---|
| JP | 10121271 | A | * | 5/1998 | C23F 11/14 |
| JP | H10-121271 | A | | 5/1998 | |
| JP | 2002-060974 | A | | 2/2002 | |
| JP | 2002-235184 | A | | 8/2002 | |
| JP | 2007-256955 | A | | 10/2007 | |
| JP | 2010-045007 | A | | 2/2010 | |
| JP | 201 01 9221 | | * | 9/2010 | H01R 4/18 |
| JP | 2010-192216 | A | | 9/2010 | |
| JP | 2010192216 | A | * | 9/2010 | |
| JP | 2010-229535 | A | | 10/2010 | |
| JP | 2011-113708 | A | | 6/2011 | |
| JP | 2012-054170 | A | | 3/2012 | |
| JP | 2012054170 | A | * | 3/2012 | H01R 4/70 |
| WO | WO 2012011382 | A1 | * | 1/2012 | H01R 4/70 |

OTHER PUBLICATIONS

Aug. 5, 2014 International Search Report issued in International Patent Application No. PCT/JP2014/068164.

Aug. 5, 2014 Written Opinion issued in International Patent Application No. PCT/JP2014/068164.

Jul. 28, 2015 International Preliminary Report on Patentability issued in International Patent Application No. PCT/JP2014/068164.

Jul. 5, 2016 Office Action issued in Japanese Patent Application No. 2013-144206.

Mar. 2, 2017 Office Action issued in Chinese Patent Application No. 201480039237.9.

Aug. 1, 2017 Office Action issued in German Patent Application No. 11 2014 002 793.6.

Nov. 17, 2017 Office Action issued in Chinese Patent Office Application No. 201480039237.9.

* cited by examiner

TERMINATED ELECTRIC WIRE AND METHOD FOR MANUFACTURING TERMINATED ELECTRIC WIRE

TECHNICAL FIELD

The present invention relates to a technique for a terminated electric wire in which a terminal is connected to an end of an electric wire.

BACKGROUND ART

Conventionally, terminated electric wires (i.e. wires provided with a terminal) that include an electric wire including a core wire and a terminal connected to the core wire exposed from an end portion of this electric wire have been known. Recently, attempts have been made to use a core wire including aluminum or an aluminum alloy in order to reduce the weight of the electric wire.

Generally, the terminal is constituted by copper or a copper alloy having a high conductivity. Therefore, there is a concern that if water attaches to a connecting portion where the terminal and the core wire are connected to each other, a so-called corrosion current flows between the terminal, the core wire, and the water, causing electrolytic corrosion.

In view of the above-described circumstances, in a terminated electric wire mentioned in Patent Document 1, a drawn portion in which the diameter is reduced toward the core wire is formed in a wire barrel that is crimped to the core wire. The infiltration of water into the wire barrel is suppressed by this drawn portion. As a result, the electrolytic corrosion is expected to be suppressed.

CITATION LIST

Patent Documents

Patent Document 1: JP 2010-45007A

However, with the above-mentioned configuration, there is a concern that if water attaches across the terminal and the core wire in a region outside of the drawn portion, a corrosion current flows between the terminal and the core wire via this water, causing the electrolytic corrosion. Hereinafter, this mechanism will be described with reference to FIG. 9.

First, in a portion of a core wire 1 including aluminum or an aluminum alloy that is in contact with water, aluminum releases electrons to the core wire and is eluted in the water as $Al^{3+}$ ions. Electrons are produced in the core wire 1 in this manner.

On the other hand, in a portion where water 2 and a terminal 3 are in contact with each other, oxygen dissolved in the water 2 (so-called dissolved oxygen) receives electrons from the terminal 3. As a result, when the water 2 is acidic, the dissolved oxygen, $H^+$ ions, and the electrons react to produce $H_2O$, and when the water 2 is neutral or alkaline, the dissolved oxygen, $H_2O$, and the electrons react to produce $OH^-$ ions. The electrons are consumed in the terminal 3 in this manner.

When the electrons are produced in the core wire 1 and consumed in the terminal 3 as mentioned above, a circuit is formed between the core wire 1 and the terminal 3 via the water 2, and a corrosion current flows in this circuit. As a result, there is a concern that aluminum is eluted in water due to the electrolytic corrosion in a portion where the water 2 is in contact with the core wire 1.

The above-mentioned problem may also arise when the core wire 1 includes a metal that is different from aluminum or an aluminum alloy and has an ionization tendency larger than that of copper.

Therefore, there is a need to provide a technique for a terminated electric wire whose electrolytic corrosion resistance is improved.

According to one aspect of the present invention, a terminated electric wire includes: an electric wire that includes a core wire including a metal having an ionization tendency larger than that of copper and being exposed from an end portion of the electric wire; and a terminal that includes copper or a copper alloy and is connected to the core wire exposed from the end portion of the electric wire, wherein a surface treating layer is formed on a surface of the terminal, the surface treating layer including a surface treating agent that is in liquid form or in paste form and whose molecular structure contains an affinity group having an affinity for the terminal and a hydrophobic group having hydrophobicity.

With this aspect of the present invention, the surface treating layer relatively firmly adheres to the surface of the terminal with the affinity group contained in the surface treating agent. The surface treating agent constituting this surface treating layer contains the hydrophobic group, and therefore, even if water droplets adhere across the core wire and the terminal, it is possible to suppress the approach of the oxygen dissolved in the water droplets to the surface of the terminal. As a result, it is possible to suppress the flow of the corrosion current between the terminal, the core wire, and the water droplets, thus making it possible to suppress the electrolytic corrosion of the core wire.

Advantageous Effects of the Invention

With the present invention, it is possible to improve the electrolytic corrosion resistance of a terminated electric wire.

DESCRIPTION OF EMBODIMENTS

Embodiment 1

Figure 1:
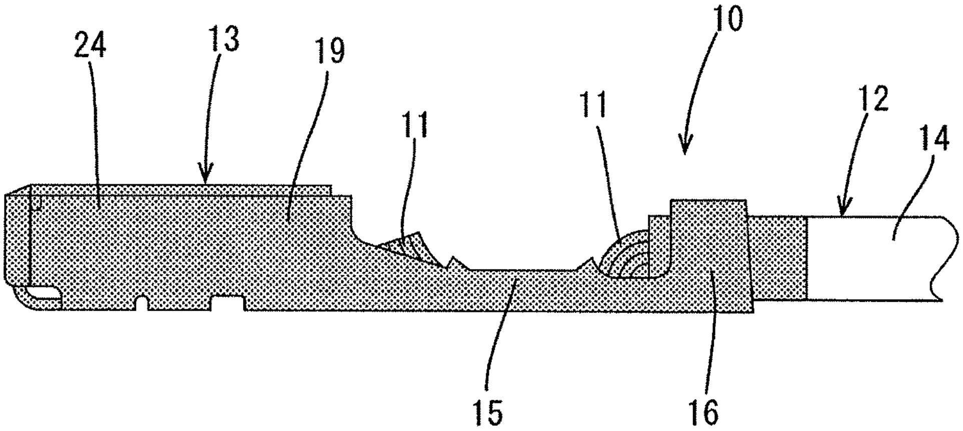
FIG. 1 is a side view of a terminated electric wire according to Embodiment 1 of the present invention.

Embodiment 1 of the present invention will be described with reference to FIGS. 1 to 7. A terminated electric wire 10 according to this embodiment includes an electric wire 12 that includes a core wire 11 including a metal having an ionization tendency larger than that of copper, and a terminal 13 that includes copper or a copper alloy. It should be noted that in the following description, the left side of FIG. 1 is referred to as "front side", and the right side thereof is referred to as "rear side".

Electric Wire 12

The electric wire 12 is obtained by covering the outer circumference of the core wire 11 with an insulating coating 14 made of a synthetic resin. A metal having an ionization tendency larger than that of copper can be used as the metal constituting the core wire 11, and examples thereof includes magnesium, aluminum, manganese, zinc, chromium, iron, cadmium, cobalt, nickel, tin, and lead, or an alloy thereof. In this embodiment, the core wire 11 includes aluminum or an aluminum alloy. The core wire 11 according to this embodiment is a stranded wire obtained by twisting a plurality of metal thin wires. A so-called single-core wire made of a metal rod material may also be used as the core wire 11. Since aluminum and an aluminum alloy have a relatively small specific gravity, the weight of the terminated electric wire 10 can be reduced as a whole.

Terminal 13

As shown in FIG. 1, the terminal 13 includes a wire barrel portion 15 that is crimped to the core wire 11 exposed from the end portion of the electric wire 12 and is electrically connected to the core wire 11, an insulation barrel portion 16 that is formed on the rear side with respect to the wire barrel portion 15 and holds the insulating coating 14, and a connecting tubular portion 19 that is formed on the front side with respect to the wire barrel portion 15 and into which a male tab 18 of a partner terminal 17 is inserted.

The terminal 13 is obtained by pressing a plate metal material made of copper or a copper alloy into a predetermined shape. A plated layer made of a metal for plating having an ionization tendency that is closer to that of copper than that of aluminum may be formed entirely or partially on the front surface and the back surface of the terminal 13. Examples of the metal for plating include zinc, nickel, and tin. Because a contact resistance between the core wire 11 and the wire barrel portion 15 can be reduced, tin is used as the metal for plating in this embodiment.

Figure 2:
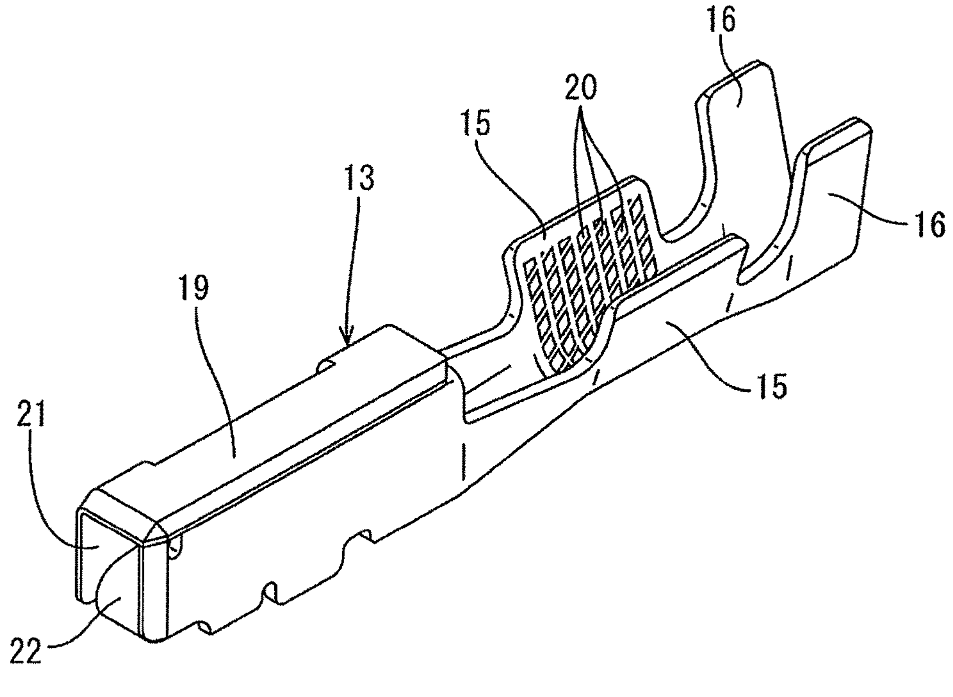
FIG. 2 is a perspective view of a terminal.

As shown in FIG. 2, a plurality of recessed portions 20 are formed on the surface of the wire barrel portion 15 on which the core wire 11 is mounted. When the wire barrel portion 15 is crimped to the core wire 11, the edges formed at hole edge portions of the recessed portions 20 come into sliding contact with the surface of the core wire 11. As a result, the metal surface of the core wire 11 is exposed by stripping an oxidized coating formed on the surface of the core wire 11. This metal surface comes into contact with the wire barrel portion 15, and thus the core wire 11 and the wire barrel portion 15 are electrically connected to each other.

Figure 3:
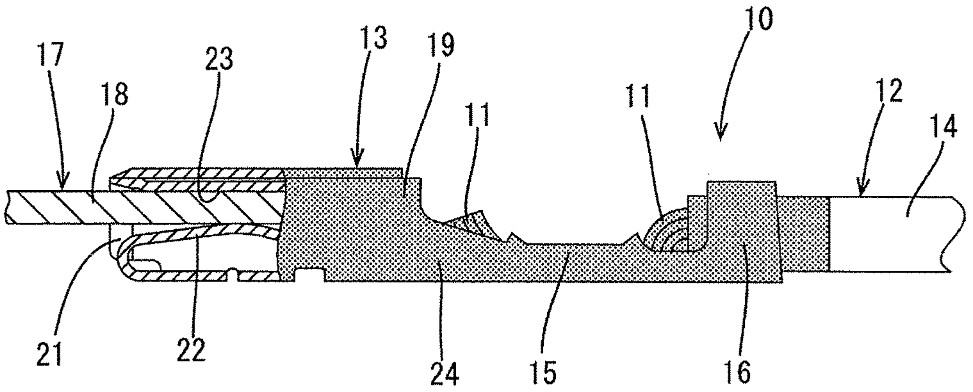
FIG. 3 is a partially cutaway side view showing a state in which the terminated electric wire is connected to a partner terminal.

As shown in FIG. 3, the connecting tubular portion 19 is formed in a prismatic tubular shape that is elongated in a front-rear direction. An opening 21 through which the male tab 18 of the partner terminal 17 is inserted is formed at the front end portion of the connecting tubular portion 19. An elastic contact piece 22 (corresponding to the connection portion) that is made by bending the front edge of the connecting tubular portion 19 rearward is formed inside the connecting tubular portion 19. The elastic contact piece 22 is elastically deformed by being pressed when the male tab 18 is inserted into the connecting tubular portion 19 from the front side. The elastic contact piece 22 is pressed against the male tab 18 (partner terminal 17) due to the elastic force of the elastic contact piece 22. On the other hand, the male tab 18 (partner terminal 17) is pressed against the inner wall 23 (corresponding to the connection portion) of the connecting tubular portion 19 by being pressed by the elastic contact piece 22. As a result, the partner terminal 17 and the terminal 13 are electrically connected to each other.

Surface Treating Layer 24

As shown in FIG. 1, a surface treating layer 24 is formed on the terminal 13, the core wire 11, and a portion of the insulating coating 14 that is located on a slightly rear side with respect to the terminal 13 in the terminated electric wire 10. Specifically, the surface treating layer 24 is formed on a portion on the front end side of the insulating coating 14, the insulation barrel portion 16 crimped to the insulating coating 14, the core wire 11 exposed from the front end portion of the insulating coating 14, the wire barrel portion 15 crimped to the core wire 11, the outer surface and the inner surface of the connecting tubular portion 19, and the elastic contact piece 22 located inside the connecting tubular portion 19. The surface treating layer 24 is formed by coating the above-mentioned regions with a surface treating agent 26 in liquid form or in paste form. The surface treating layer 24 is shown as a shaded region in the drawings.

The molecular structure of the surface treating agent 26 contains an affinity group that has an affinity for the terminal 13 including copper or a copper alloy, and a hydrophobic group that has hydrophobicity.

"Have an affinity" includes cases where an electron contained in the affinity group binds to the surface of the terminal 13 via a coordinate bond, an ionic bond, or the like, and cases where the affinity group more strongly adsorbs to the surface of the terminal 13 by a certain interaction (e.g., Coulomb's force) between the electron contained in the affinity group and the surface of the terminal 13 than by merely a physical adsorption.

The affinity group may also have an affinity for a copper atom exposed on the surface of the terminal 13, or for an oxide of copper formed on the surface of the terminal 13, or for a metal or a metal compound other than copper included in the terminal 13.

As mentioned above, the surface treating layer 24 relatively firmly adheres to the surface of the terminal 13 by the affinity group binding or adsorbing to the surface of the terminal 13.

Moreover, the surface treating layer 24 has hydrophobicity due to the hydrophobic group contained in the surface treating agent 26. The adhesion of water to the surface of the terminal 13 can be suppressed due to the hydrophobicity of the hydrophobic group. It is sufficient that a portion of the molecular structure of the hydrophobic group has hydrophobicity. That is, the molecular structure of the surface treating agent 26 may partially contain a hydrophilic group having hydrophilicity.

A nitrogen-containing heterocyclic group can be used as the affinity group. Examples of a basic compound containing the nitrogen-containing heterocyclic group include pyrrole, pyrrolidine, imidazole, thiazole, pyridine, piperidine, pyrimidine, indole, quinoline, isoquinoline, purine, benzimidazole, benzotriazole, and benzothiazole, or a derivative thereof.

Moreover, a chelating group derived from one or more chelating ligands selected from polyphosphate, aminocarboxylic acid, 1,3-diketone, acetoacetic acid (ester), hydroxycarboxylic acid, polyamine, amino alcohol, aromatic heterocyclic bases, phenols, oximes, Schiff base, tetrapyrroles, sulfur compounds, synthetic macrocyclic compounds, phosphonic acid, and hydroxyethylidene phosphonic acid can be used as the affinity group.

The surface treating agent 26 may include a compound represented by General Formula (1) below:

[Chemical Formula 3]

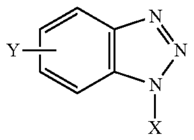

(1)

where X represents a hydrophobic group, and Y represents a hydrogen atom or a lower alkyl group.

Moreover, the hydrophobic group represented by the above-mentioned X may have a configuration represented by General Formula (2) below:

[Chemical Formula 4]

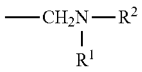

(2)

where $R^1$ and $R^2$ independently represent a hydrogen atom, or an alkyl group, a vinyl group, an allyl group or an aryl group that has 1 to 15 carbon atoms.

Examples of the hydrophobic group represented by above-mentioned X include a linear or branched alkyl group, a vinyl group, an allyl group, a cycloalkyl group, and an aryl group. These groups may be included alone or in combination of two or more. In this case, if a fluorine atom is introduced into a linear or branched alkyl group, a vinyl group, an allyl group, a cycloalkyl group, an aryl group, or the like, the hydrophobicity is further improved. The hydrophobic group may include an amide bond, an ether bond, or an ester bond. Moreover, the molecular chain of the hydrophobic group may include a double bond or a triple bond.

Examples of the alkyl group include a linear alkyl group, a branched alkyl group, and a cycloalkyl group.

Examples of the linear alkyl group include a methyl group, an ethyl group, a propyl group, a butyl group, a propyl group, a pentyl group, a hexyl group, a heptyl group, an octyl group, a nonyl group, a decyl group, an undecyl group, a dodecyl group, a tridecyl group, a tetradecyl group, and a pentadecyl group. The linear alkyl group has preferably 1 to 100 carbons, more preferably 3 to 15 carbons, still more preferably 5 to 11 carbons, and particularly preferably 7 to 9 carbons.

Examples of the branched alkyl group include an isopropyl group, a 1-methylpropyl group, a 2-methylpropyl group, a tert-butyl group, a 1-methylbutyl group, a 2-methylbutyl group, a 3-methylbutyl group, a 1,1-dimethylpropyl group, a 1,2-dimethylpropyl group, a 2,2-dimethylpropyl group, a 1-methylpentyl group, a 2-methylpentyl group, a 3-methylpentyl group, a 4-methylpentyl group, a 1,1-dimethylbutyl group, a 1,2-dimethylbutyl group, a 1,3-dimethylbutyl group, a 2,2-dimethylbutyl group, a 2,3-dimethylbutyl group, a 5-methylhexyl group, a 6-methylheptyl group, a 2-methylhexyl group, a 2-ethylhexyl group, a 2-methylheptyl group, and a 2-ethylheptyl group. The branched alkyl group has preferably 3 to 100 carbons, more preferably 3 to 15 carbons, still more preferably 5 to 11 carbons, and particularly preferably 7 to 9 carbons.

Examples of the cycloalkyl group include a cyclopropyl group, a cyclobutyl group, a cyclopentyl group, a methylcyclopentyl group, a dimethylcyclopentyl group, a cyclopentylmethyl group, a cyclopentylethyl group, a cyclohexyl group, a methylcyclohexyl group, a dimethylcyclohexyl group, a cyclohexylmethyl group, and a cyclohexylethyl group. The cycloalkyl group has preferably 3 to 100 carbons, more preferably 3 to 15 carbons, still more preferably 5 to 11 carbons, and particularly preferably 7 to 9 carbons.

Examples of the aryl group include a phenyl group, a 1-naphtyl group, a 2-naphtyl group, a 2-phenylphenyl group, a 3-phenylphenyl group, a 4-phenylphenyl group, a 9-anthryl group, a methylphenyl group, a dimethylphenyl group, a trimethylphenyl group, an ethylphenyl group, a methylethylphenyl group, a diethylphenyl group, a propylphenyl group, and a butylphenyl group. The aryl group has preferably 6 to 100 carbons, more preferably 6 to 15 carbons, still more preferably 6 to 11 carbons, and particularly preferably 7 to 9 carbons.

Moreover, the above-mentioned Y is preferably a hydrogen atom or a lower alkyl group, and more preferably a methyl group.

A compound represented by Chemical Formula (3) below can be used as the surface treating agent 26. BT-LX (available from Johoku Chemical Co. Ltd.) can be used as this surface treating agent 26, for example.

[Chemical Formula 5]

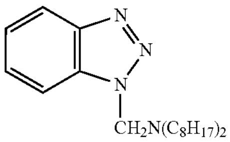

(3)

The surface treating agent 26 may include one or both of a compound represented by Chemical Formula (4) below and a compound represented by Chemical Formula (5) below. TT-LX (available from Johoku Chemical Co. Ltd.) can be used as this surface treating agent 26, for example.

[Chemical Formula 6]

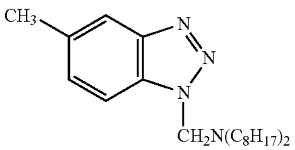

(4)

[Chemical Formula 7]

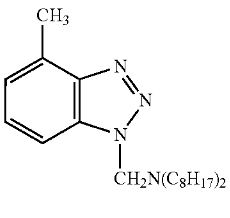

(5)

The surface treating agent 26 may be dissolved in a known solvent. Water, an organic solvent, wax, oil, or the like can be used as the solvent, for example. Examples of the organic solvent include an aliphatic-based solvent such as n-hexane, isohexane, or n-heptane; an ester-based solvent such as ethyl acetate or butyl acetate; an ether-based solvent such as tetrahydrofuran; a ketone-based solvent such as acetone; an aromatic-based solvent such as toluene or xylene; and an alcohol-based solvent such as methanol, ethanol, propyl alcohol, or isopropyl alcohol. Examples of the wax include polyethylene wax, synthetic paraffin, natural paraffin, micro wax, and chlorinated hydrocarbon. Examples of the oil include a lubricating oil, an operating oil, a heat medium oil, and a silicone oil.

As a method for forming the surface treating layer 24 on the terminal 13, the terminal 13 may be immersed in the surface treating agent 26, or the terminal 13 may be immersed in a solvent containing the surface treating agent 26, or the terminal 13 may be coated with the surface treating agent 26 using a brush, or the surface treating agent 26 or a solution obtained by dissolving the surface treating agent 26 in a solvent may be sprayed on the terminal 13. Moreover, it is also possible to adjust the coating amount, make the appearance uniform, and equalize the film thickness with an air knife method or a roll squeeze method after coating treatment, immersing treatment, or spraying treatment with a squeeze coater or the like. When the terminal 13 is coated with the surface treating agent 26, the solution containing the surface treating agent 26, or the like, it is possible to perform warming treatment, compressing treatment, or the like on the surface treating layer 24 as needed in order to improve the adhesion and corrosion resistance.

When the solution obtained by dissolving the surface treating agent 26 in the solvent is used to form the surface treating layer 24, a process for evaporating the solvent by heating the surface treating layer 24 or reducing pressure, for example, may be carried out.

Manufacturing Process of this Embodiment

Next, an example of a process for manufacturing the terminated electric wire 10 according to this embodiment will be described. It should be noted that the process for manufacturing the terminated electric wire 10 is not limited to the following description.

First, as shown in FIG. 2, the terminal 13 is formed by pressing a plate metal material made of copper or a copper alloy.

Next, the core wire 11 is exposed by stripping the insulating coating 14 at an end portion of the electric wire 12.

Figure 4:
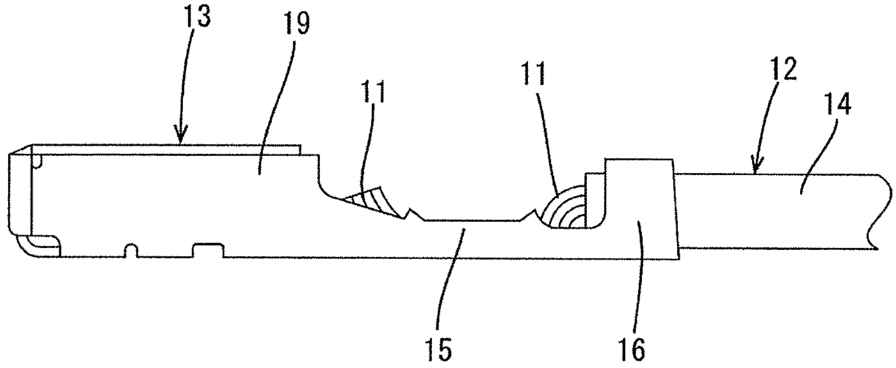
FIG. 4 is a side view showing a state in which an electric wire is connected to a terminal.

Then, as shown in FIG. 4, the wire barrel portion 15 of the terminal 13 is crimped to the core wire 11 exposed at the end portion of the electric wire 12, and the insulation barrel portion 16 is crimped to the insulating coating 14.

Figure 5:
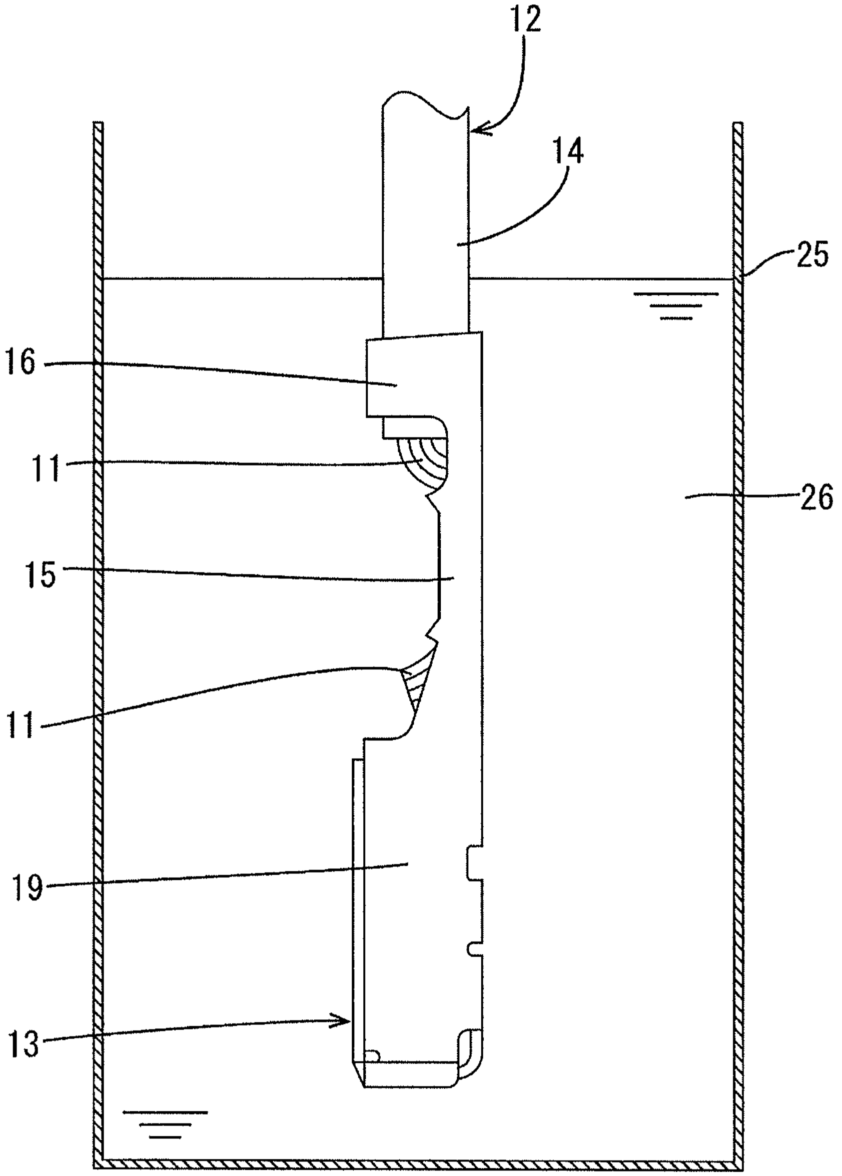
FIG. 5 is a schematic diagram showing a state in which the terminal and the electric wire are immersed in a surface treating agent.

Next, as shown in FIG. 5, a vessel 25 is filled with the surface treating agent 26. The terminal 13 connected to the end portion of the electric wire 12 is immersed in this surface treating agent 26. The terminal 13, the core wire 11 connected to the terminal 13, and a portion of the insulating coating 14 near the terminal 13 are immersed in the surface treating agent 26. As a result, the surface treating layer 24 is formed on the surface of the terminal 13.

The terminated electric wire 10 is completed by carrying out the above-mentioned processes.

Description of Conventional Technique

Figure 9:
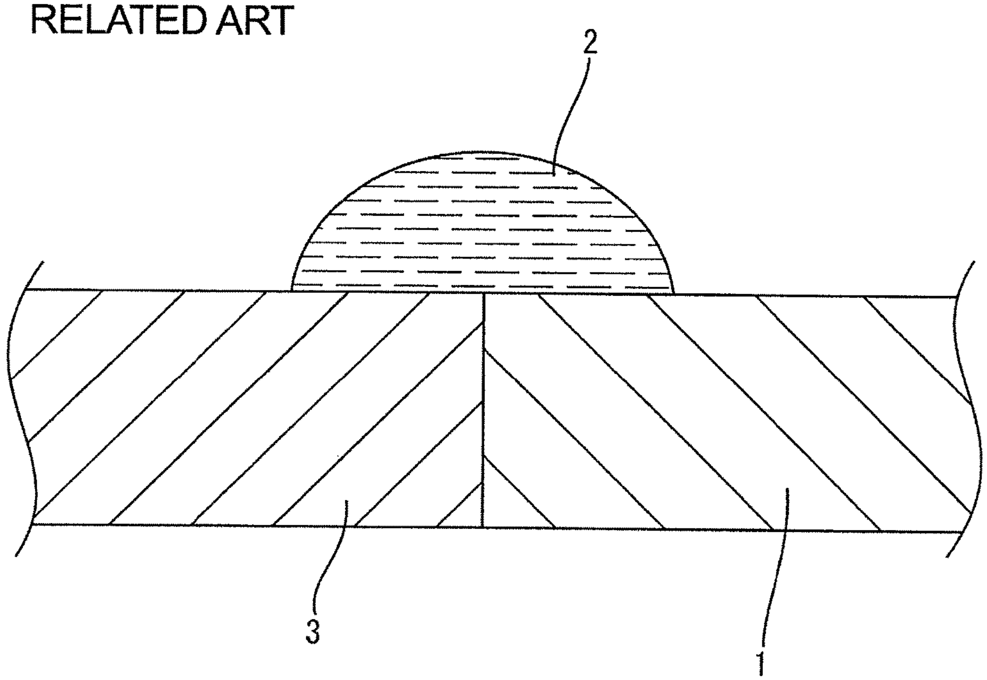
FIG.9 RELATED ART
FIG. 9 is a schematic diagram showing a connection structure in which a terminal is connected to a core wire according to a conventional technique.

In a conventional technique, there is a risk that if the water 2 attaches across the core wire 1 and the terminal 3 as shown in FIG. 9, a so-called corrosion current flows between the core wire 1, the terminal 3, and the water 2, causing the core wire 1 to be eroded due to electrolytic corrosion.

Description of Virtual Technique

Figure 6:
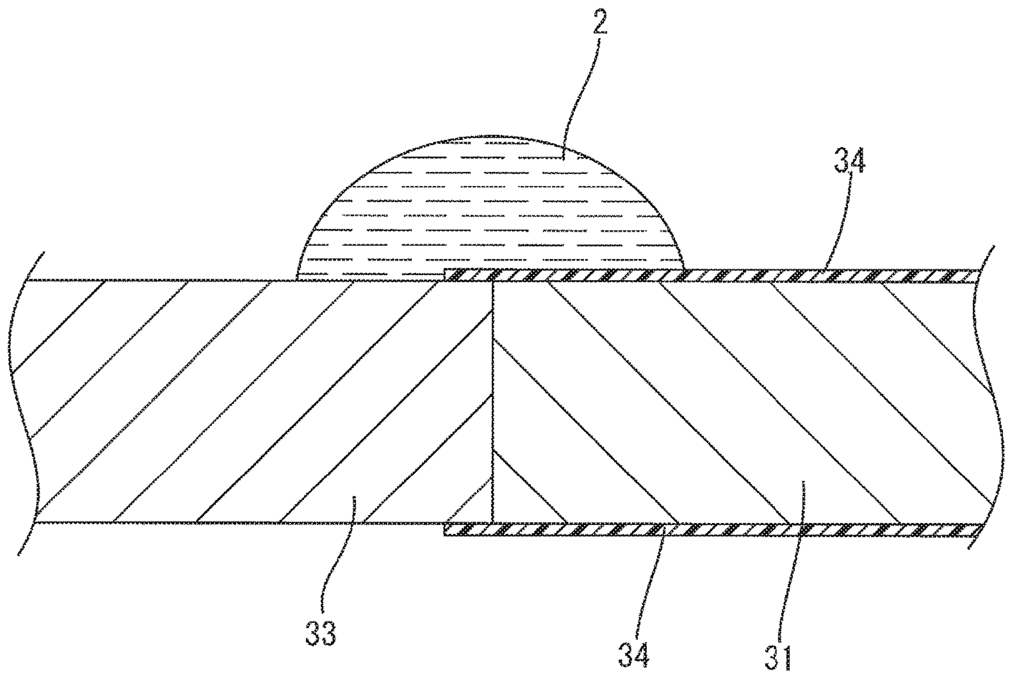
FIG. 6 is a schematic diagram showing a connection structure in which a terminal is connected to a core wire according to a virtual technique.
Figure 7:
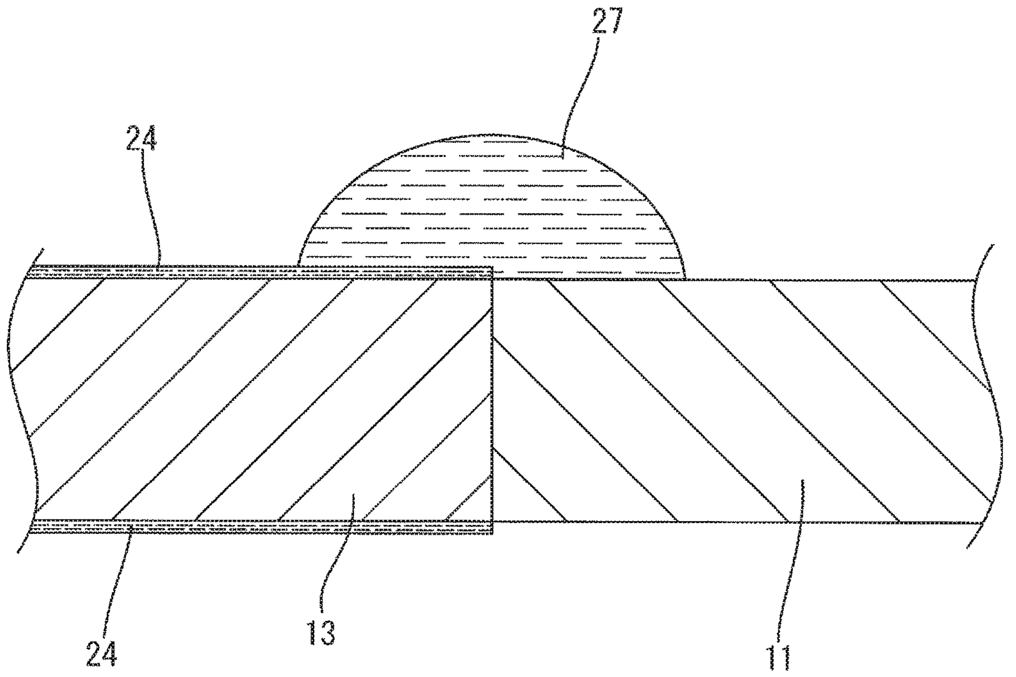
FIG. 7 is a schematic diagram showing a connection structure in which a terminal is connected to a core wire according to an aspect of the present invention.

If a core wire 31 and a terminal 33 are connected to each other as shown in FIG. 6, for example, a configuration in which the surface of the core wire 31 to be eroded due to electrolytic corrosion is covered with an insulating coating 34 is possible as a virtual technique for suppressing electrolytic corrosion. It is conceivable that a synthetic resin, an oxidized coating, or the like can be used as the coating 34.

However, with the above-mentioned virtual technique, there is a concern that if a pinhole is formed in the coating 34, the corrosion current flows through this pinhole in a concentrated manner. As a result, there is a concern that the core wire 31 undergoes electrolytic corrosion in a concentrated manner at a position corresponding to the pinhole formed in the coating 34.

Operations and Effects of this Embodiment

In view of the above-described circumstances, the terminated electric wire 10 according to this embodiment has a configuration in which the surface treating layer 24 including the surface treating agent 26, which is in liquid form or in paste form and whose molecular structure contains the affinity group having an affinity for the terminal 13 including copper or a copper alloy and the hydrophobic group having hydrophobicity, is formed on the surface of the terminal 13.

The configuration according to this embodiment is different from that of the conventional technique and the above-mentioned virtual technique in that the surface treating layer 24 is not formed on the core wire 11, which is eroded due to electrolytic corrosion, but on the terminal 13, which is not eroded due to electrolytic corrosion. The configuration according to this embodiment will be described with reference to FIG. 7.

With this embodiment, the surface treating layer 24 relatively firmly adheres to the surface of the terminal 13 with the affinity group contained in the surface treating agent 26. The surface treating agent 26 included in this surface treating layer 24 contains the hydrophobic group, and therefore, even if water 27 adheres across the core wire 11 and the terminal 13, it is possible to suppress the approach of the oxygen dissolved in the water 27 to the surface of the terminal 13. As a result, it is possible to suppress the flow of the corrosion current between the terminal 13, the core wire 11, and the water 27, thus making it possible to suppress the electrolytic corrosion of the core wire 11.

With this embodiment, if a pinhole is formed in the surface treating layer 24 formed on the terminal 13, the corrosion current flows through the pinhole formed in the terminal 13 in a concentrated manner. However, the terminal 13 including copper or a copper alloy is not eroded due to electrolytic corrosion. On the other hand, in the core wire 11 including a metal having an ionization tendency larger than that of copper, the corrosion current flows in the entire core wire 11, thus suppressing electrolytic corrosion progressing in a concentrated manner in the core wire 11.

In this embodiment, the core wire 11 is configured to include aluminum or an aluminum alloy. In this manner, even when the core wire 11 includes aluminum or an aluminum alloy, it is possible to reliably suppress electrolytic corrosion of the core wire 11. In addition, since the core wire 11 includes aluminum or an aluminum alloy, it is possible to reduce the weight of the electric wire 12.

In this embodiment, the affinity group is a nitrogen-containing heterocyclic group or a chelating group. It is possible to further improve the affinity of the surface treating layer 24 for the terminal 13 due to the chelating group or a nitrogen atom contained in the nitrogen-containing heterocyclic group.

In this embodiment, the surface treating agent 26 includes a compound represented by General Formula (1) below:

[Chemical Formula 8]

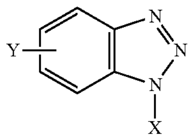

(1)

where X represents a hydrophobic group, and Y represents a hydrogen atom or a lower alkyl group.

With this embodiment, the hydrophobic group is substituted near the nitrogen atom having an affinity for the terminal 13, thus making it possible to effectively suppress the approach of the oxygen dissolved in water to the surface of the terminal 13.

In this embodiment, the hydrophobic group represented by the X is represented by General Formula (2) below:

[Chemical Formula 9]

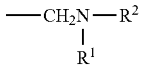

(2)

where $R^1$ and $R^2$ independently represent an alkyl group, a vinyl group, an allyl group or an aryl group that has 1 to 15 carbon atoms.

With this embodiment, the hydrophobic group has two organic groups, $R^1$ and $R^2$, and thus is excellent in hydrophobicity. This makes it possible to further suppress the approach of the oxygen dissolved in water to the surface of the terminal 13.

With this embodiment, $R^1$ and $R^2$ are independently a linear alkyl group, a branched alkyl group, or a cycloalkyl group that has 5 to 11 carbon atoms. Accordingly, the hydrophobic group contains a relatively large number of carbon atoms, thus making it possible to improve the hydrophobicity. This makes it possible to further suppress the approach of the oxygen dissolved in water to the surface of the terminal 13.

With this embodiment, Y is a hydrogen atom or a methyl group. As a result, it is possible to form the dense surface treating layer 24 on the surface of the terminal 13. This makes it possible to reliably suppress the approach of the oxygen dissolved in water to the surface of the terminal 13.

With this embodiment, the terminal 13 includes the connection portion (the elastic contact piece 22 and the inner wall 23 of the connecting tubular portion 19), which is electrically connected to the partner terminal 17 by being pressed against the partner terminal 17 or by the partner terminal 17 being pressed against the connection portion. Accordingly, the connection portion is pressed against the partner terminal 17 or the partner terminal 17 is pressed against the connection portion, and thus the surface treating layer 24 in liquid form or in paste form is removed from a portion where the connection portion is in contact with the partner terminal 17. Accordingly, the connection portion and the partner terminal 17 are electrically connected to each other.

The method for manufacturing the terminated electric wire 10 according to this embodiment includes a step of exposing the core wire 11 from the end portion of the electric wire 12 including the core wire 11 containing a metal having an ionization tendency larger than that of copper, a step of connecting the terminal 13 including copper or a copper alloy to the core wire 11 exposed from the end portion of the electric wire 12, and a step of forming the surface treating layer 24 on the surface of the terminal 13 by immersing at least the terminal 13 in the surface treating agent 26, which is in liquid form or in paste form and whose molecular structure contains an affinity group that has an affinity for the terminal 13 and a hydrophobic group that has hydrophobicity, or in a solution containing the surface treating agent 26.

With this embodiment, the surface treating layer 24 can be formed on the surface of the terminal 13 with a simple method in which the terminal 13 is immersed in the surface treating agent 26, thus making it possible to simplify the process for manufacturing the terminated electric wire 10.

Embodiment 2

Figure 8:
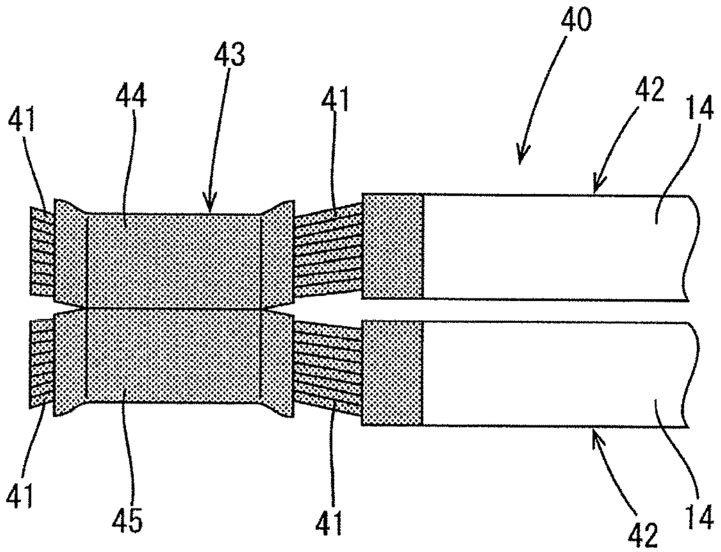
FIG. 8 is a side view of a terminated electric wire according to Embodiment 2 of the present invention.

Next, Embodiment 2 of the present invention will be described with reference to FIG. 8. A terminated electric wire 40 according to this embodiment includes a plurality of (two, in this embodiment) electric wires 42 that each include a core wire 41 made of a metal member including aluminum or an aluminum alloy having an ionization tendency larger than that of copper, and a spliced terminal 43 (an example of the terminal 13) that includes copper or a copper alloy and is connected to a plurality of core wires 41 exposed from end portions of the electric wires 42. It should be noted that the repetitions of the descriptions in Embodiment 1 are omitted.

In this embodiment, the spliced terminal 43 includes a wire barrel portion 44 that is crimped to both of the two core wires 41 so as to be wound around the core wires 41.

A plated layer (not shown) made of a metal for plating having an ionization tendency that is closer to that of copper than that of aluminum may be formed on the surface of the spliced terminal 43. Examples of the metal for plating include zinc, nickel, and tin.

A surface treating layer 45 including the surface treating agent 26 in liquid form or in paste form is formed on the surface of the spliced terminal 43. The surface treating layer 45 is shown as a shaded region in the drawings.

The surface treating layer 45 is formed by immersing the spliced terminal 43 and the end portions of the two electric wires 42 in the vessel 25 into which the surface treating agent 26 is poured.

With this embodiment, electrolytic corrosion can be suppressed in the terminated electric wire 40 in which the electric wires 42 are connected by the spliced terminal 43.

Other Embodiments

The present invention is not limited to the embodiments, which have been described using the foregoing descriptions and the drawings, and, for example, embodiments as described below are also encompassed within the technical scope of the present invention.

(1) Although the embodiment 1 had a configuration in which the terminal 13 and the core wire 11 are electrically connected to each other by crimping the wire barrel portion 15 formed in the terminal 13 to the core wire 11, there is no limitation to this. The terminal 13 and the core wire 11 can be electrically connected to each other with a known method such as pressure welding in which the core wire 11 is held between a pair of pressure-welding blades, ultrasonic welding, laser welding, or resistance welding.

(2) Although the electric wire 12 obtained by covering the outer circumference of the core wire 11 with the insulating coating 14 was used in the embodiment 1, a so-called bare electric wire in which the outer circumference of the core wire 11 is not covered with the insulating coating 14 may also be used as the electric wire 12.

(3) The terminal 13 may be a male terminal having a tab-shaped connection portion or a so-called LA terminal in which a through hole is formed in a plate-shaped connection portion, and any terminal can be selected as needed.

(4) Although the embodiment 1 had a configuration in which the surface treating layer 24 is also formed on the surface of the core wire 11, a configuration in which the surface treating layer 24 is not formed on the surface of the core wire 11 and formed on only the surface of the terminal 13 is also possible.

(5) Although Embodiment 2 had a configuration in which the two electric wires 42 are connected by the spliced terminal 43, there is no limitation to this. A configuration in which three or more electric wires 42 are connected by a spliced terminal 43 is also possible.

LIST OF REFERENCE NUMERALS

10, 40: Terminated electric wire
11, 41: Core wire
12, 42: Electric wire
13: Terminal
22: Elastic contact piece (connection portion)
23: Inner wall (connection portion)
24, 45: Surface treating layer
43: Spliced terminal According to one aspect of the technique described in the specification, a terminated electric wire includes: an electric wire that includes a core wire including a metal having an ionization tendency larger than that of copper and being exposed from an end portion of the electric wire; and a terminal that includes copper or a copper alloy and is connected to the core wire exposed from the end portion of the electric wire, wherein a surface treating layer is formed on a surface of the terminal, the surface treating layer including a surface treating agent that is in liquid form or in paste form and whose molecular structure contains an affinity group having an affinity for the terminal and a hydrophobic group having hydrophobicity.

With this aspect of the technique described in the specification, the surface treating layer relatively firmly adheres to the surface of the terminal with the affinity group contained in the surface treating agent. The surface treating agent constituting this surface treating layer contains the hydrophobic group, and therefore, even if water droplets adhere across the core wire and the terminal, it is possible to suppress the approach of the oxygen dissolved in the water droplets to the surface of the terminal. As a result, it is possible to suppress the flow of the corrosion current between the terminal, the core wire, and the water droplets, thus making it possible to suppress the electrolytic corrosion of the core wire.

The following aspects are preferable for embodiments of the technique described in the specification. The core wire may be configured to include aluminum or an aluminum alloy.

With the above-mentioned aspect, it is possible to reliably suppress the electrolytic corrosion of the core wire including aluminum or an aluminum alloy.

It is preferable that the affinity group is a nitrogen-containing heterocyclic group.

With the above-mentioned aspect, it is possible to further improve the affinity of the surface treating layer for the terminal due to a nitrogen atom contained in the nitrogen-containing heterocyclic group.

It is preferable that the affinity group is a chelating group derived from one or more chelating ligands selected from polyphosphate, aminocarboxylic acid, 1,3-diketone, acetoacetic acid (ester), hydroxycarboxylic acid, polyamine, amino alcohol, aromatic heterocyclic bases, phenols, oximes, Schiff base, tetrapyrroles, sulfur compounds, synthetic macrocyclic compounds, phosphonic acid, and hydroxyethylidene phosphonic acid.

With the above-mentioned aspect, it is possible to further improve the affinity of the surface treating layer for the terminal due to the chelating group binding to the surface of the terminal.

It is preferable that the surface treating agent includes a compound represented by General Formula (1):

[Chemical Formula 1]

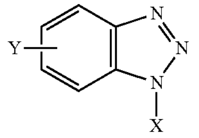

(1)

where X represents a hydrophobic group, and Y represents a hydrogen atom or a lower alkyl group.

With the above-mentioned aspect, the hydrophobic group is substituted near the nitrogen atom having an affinity for the terminal, thus making it possible to effectively suppress the approach of the oxygen dissolved in water to the surface of the terminal.

It is preferable that the hydrophobic group represented by the X is represented by General Formula (2):

[Chemical Formula 2]

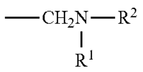

(2)

where $R^1$ and $R^2$ independently represent an alkyl group, a vinyl group, an allyl group or an aryl group that has 1 to 15 carbon atoms.

With the above-mentioned aspect, the hydrophobic group has two organic groups, $R^1$ and $R^2$, and thus is excellent in hydrophobicity. This makes it possible to further suppress the approach of the oxygen dissolved in water to the surface of the terminal.

It is preferable that the $R^1$ and the $R^2$ are independently a linear alkyl group, a branched alkyl group, or a cycloalkyl group that has 5 to 11 carbon atoms.

With the above-mentioned aspect, the hydrophobic group contains a relatively large number of carbon atoms, thus making it possible to improve the hydrophobicity. This makes it possible to further suppress the approach of the oxygen dissolved in water to the surface of the terminal.

It is preferable that the Y is a hydrogen atom or a methyl group.

With the above-mentioned aspect, it is possible to form a dense surface treating layer on the surface of the terminal. This makes it possible to reliably suppress the approach of the oxygen dissolved in water to the surface of the terminal.

It is preferable that the terminal includes a connection portion that is electrically connected to a partner terminal by being pressed against the partner terminal or by the partner terminal being pressed against the connection portion.

With the above-mentioned aspect, the connection portion is pressed against the partner terminal or the partner terminal is pressed against the connection portion, and thus the surface treating layer in liquid form or in paste form is removed from a portion where the connection portion is in contact with the partner terminal. Accordingly, the connection portion and the partner terminal are electrically connected to each other.

Moreover, according to one aspect of the technique described in the specification, a method for manufacturing a terminated electric wire includes: connecting a terminal including copper or a copper alloy to a core wire that includes a metal having an ionization tendency larger than that of copper and that is exposed from an end portion of an electric wire including the core wire; and forming a surface treating layer on a surface of the terminal by immersing the terminal in a surface treating agent that is in liquid form or in paste form and whose molecular structure contains an affinity group having an affinity for the terminal and a hydrophobic group having hydrophobicity, or in a solution containing the surface treating agent.

With this aspect of the technique described in the specification, the surface treating layer can be formed on the surface of the terminal with a simple method in which the terminal is immersed in the surface treating agent, thus making it possible to simplify a process for manufacturing a terminated electric wire.

The invention claimed is:

1. A terminated electric wire comprising:

an electric wire that includes a core wire including a metal having an ionization tendency larger than that of copper and being exposed at an end portion of the electric wire; and a terminal that includes copper or a copper alloy and is connected to the core wire exposed from the end portion of the electric wire, wherein a surface treating layer is formed on a surface of the entire terminal and is not formed on a surface of the core wire, the surface treating layer including a surface treating agent that is in liquid form or in paste form and whose molecular structure contains an affinity group having an affinity for the terminal and a hydrophobic group having hydrophobicity, and wherein following the surface treating layer being formed, the core wire remains exposed.

2. The terminated electric wire according to claim 1, wherein the core wire includes aluminum or an aluminum alloy.

3. The terminated electric wire according to claim 1, wherein the affinity group is a nitrogen-containing heterocyclic group.

4. The terminated electric wire according to claim 1, wherein the affinity group is a chelating group derived from one or more chelating ligands selected from polyphosphate, aminocarboxylic acid, 1,3-diketone, acetoacetic acid (ester), hydroxycarboxylic acid, polyamine, amino alcohol, aromatic heterocyclic bases, phenols, oximes, Schiff base, tetrapyrroles, sulfur compounds, synthetic macrocyclic compounds, phosphonic acid, and hydroxyethylidene phosphonic acid.

5. The terminated electric wire according to claim 1, wherein the surface treating agent includes a compound represented by General Formula (1):

[Chemical Formula 1]

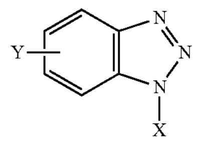

(1)

where X represents a hydrophobic group, and Y represents a hydrogen atom or a lower alkyl group.

6. The terminated electric wire according to claim 5, wherein the hydrophobic group represented by the X is represented by General Formula (2):

[Chemical Formula 2]

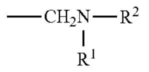

(2)

where $R^1$ and $R^2$ independently represent an alkyl group, a vinyl group, an allyl group or an aryl group that has 1 to 15 carbon atoms.

7. The terminated electric wire according to claim 6, wherein the $R^1$ and the $R^2$ are independently a linear alkyl group, a branched alkyl group, or a cycloalkyl group that has 5 to 11 carbon atoms.

8. The terminated electric wire according to claim 5, wherein the Y is a hydrogen atom or a methyl group.

9. The terminated electric wire according to claim 1, wherein the terminal includes a connection portion that is electrically connected to a partner terminal by being pressed against the partner terminal or by the partner terminal being pressed against the connection portion.

* * * * *